Figure 1:
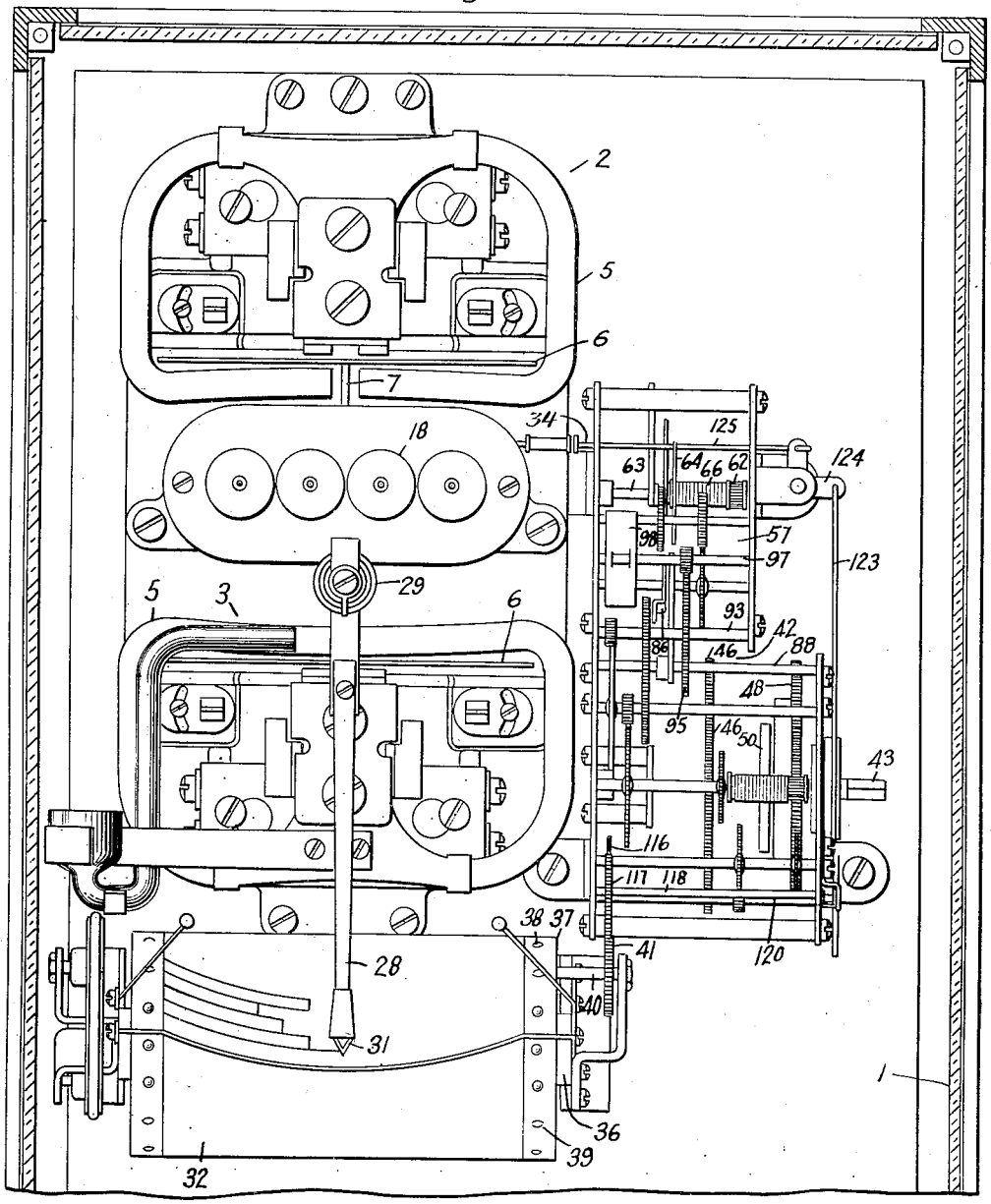

W. M. BRADSHAW AND W. G. MYLIUS.
ELECTRICAL MEASURING INSTRUMENT.
APPLICATION FILED JULY 12, 1915.

1,336,611.

Patented Apr. 13, 1920.
4 SHEETS—SHEET 1.

WITNESSES:
Fred H. Miller
J. A. Procter

INVENTOR
William M. Bradshaw &
Walter G. Mylius
BY
Wesley G. Carr
ATTORNEY

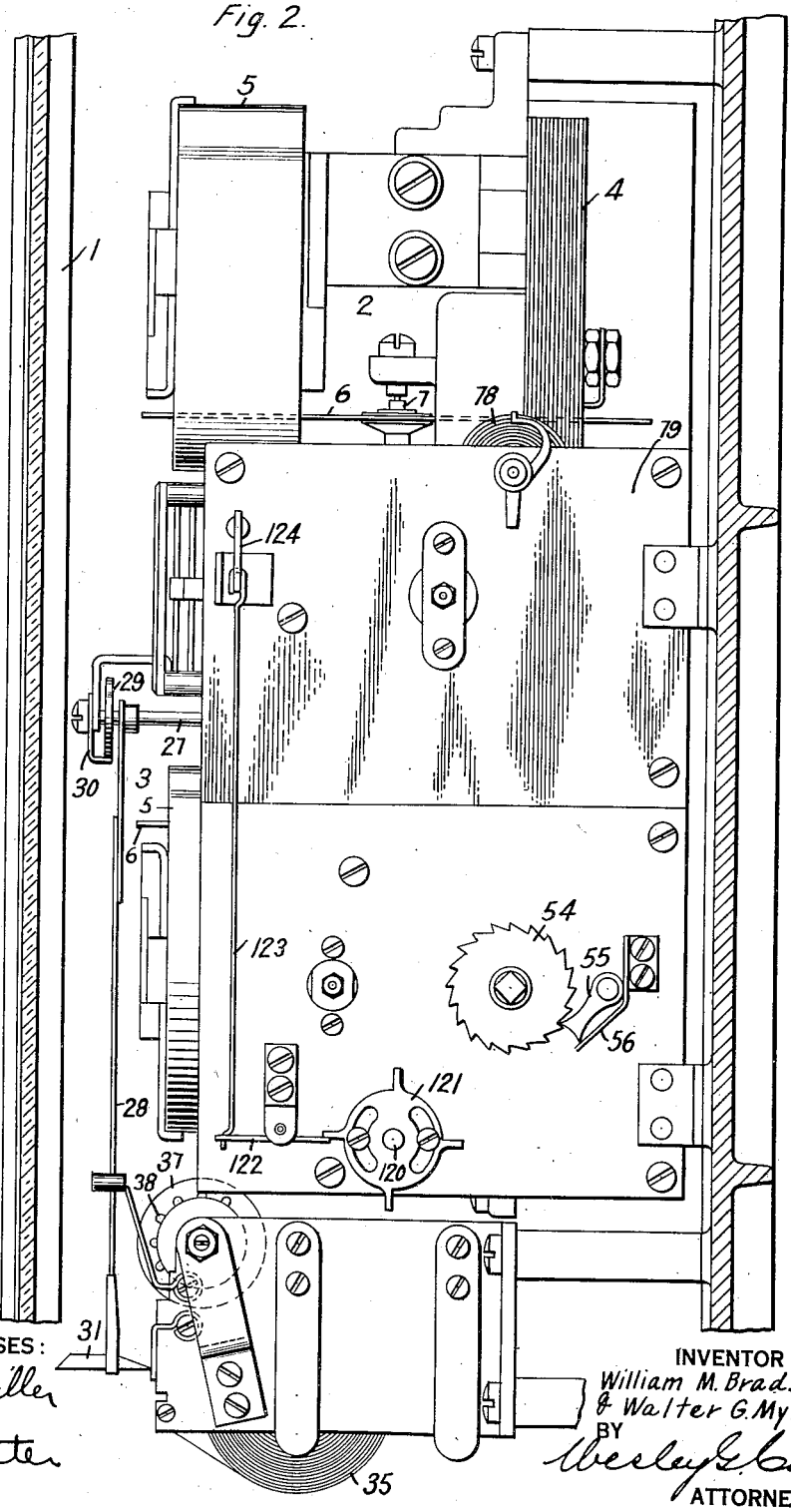

W. M. BRADSHAW AND W. G. MYLIUS.
ELECTRICAL MEASURING INSTRUMENT.
APPLICATION FILED JULY 12, 1915.
1,336,611.
Patented Apr. 13, 1920.
4 SHEETS—SHEET 3.
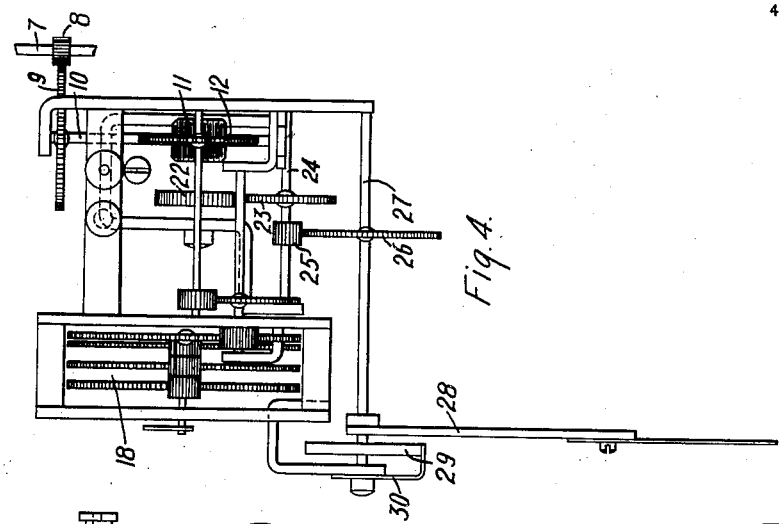
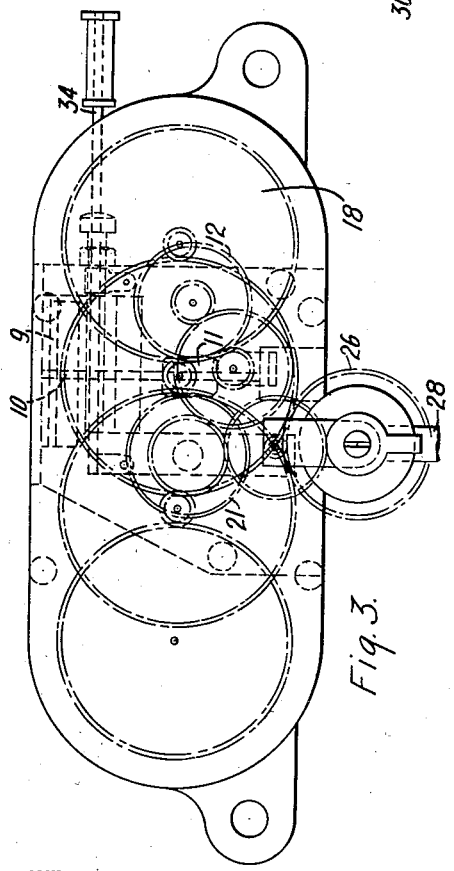
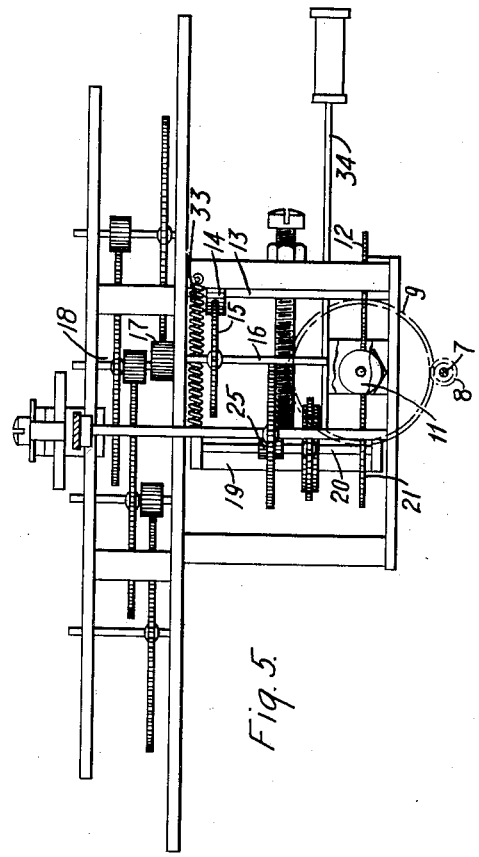
WITNESSES:
Fred A. Lind.
J H Procter
INVENTOR
William M. Bradshaw
& Walter G. Mylius
BY
Wesley L Carr
ATTORNEY W. M. BRADSHAW AND W. G. MYLIUS.
ELECTRICAL MEASURING INSTRUMENT.
APPLICATION FILED JULY 12, 1915.

1,336,611.

Patented Apr. 13, 1920.

4 SHEETS—SHEET 4.

WITNESSES:

INVENTORS
William M. Bradshaw &
Walter G. Mylius.
BY
Wesley G. Carr
ATTORNEY

UNITED STATES PATENT OFFICE.

WILLIAM M. BRADSHAW AND WALTER G. MYLIUS, OF WILKINSBURG, PENNSYLVANIA, ASSIGNORS TO WESTINGHOUSE ELECTRIC AND MANUFACTURING COMPANY, A CORPORATION OF PENNSYLVANIA.

ELECTRICAL MEASURING INSTRUMENT.

1,336,611.  Specification of Letters Patent.  Patented Apr. 13, 1920.

Application filed July 12, 1915. Serial No. 39,379.

*To all whom it may concern:*

Be it known that we, WILLIAM M. BRADSHAW, a citizen of the United States, and a resident of Wilkinsburg, in the county of Allegheny and State of Pennsylvania, and WALTER G. MYLIUS, a citizen of the United States, and a resident of Wilkinsburg, in the county of Allegheny and State of Pennsylvania, have invented a new and useful Improvement in Electrical Measuring Instruments, of which the following is a specification.

Our invention relates to electrical measuring instruments and particularly to electrical instruments by means of which periodic demands for power are recorded.

One object of our invention is to provide a compact and inexpensive instrument of the character indicated by means of which the periodic demands for power are graphically recorded upon a record sheet that is advanced intermittently a predetermined time interval before the resetting of the recording stylus, thereby providing a record having a flat top that may be conveniently and expeditiously read.

Another object of our invention is to provide a graphic measuring instrument that is so simplified in its construction as to preclude the necessity of using auxiliary actuating devices for the recording stylus, such as electrical relays and their accompanying contacting devices.

Heretofore, graphic demand meters have been constructed that produced a record having a substantially flat top, but such meters were provided with at least two movable members, one of which was reset periodically and the other of which carried the stylus and remained in its maximum position until the end of the next demand period. When devices of this character were used, relays were necessary in order to develop sufficient torque to actuate the stylus, and electrical means were usually provided for advancing the record sheet. The use of electrical means for this purpose made it necessary to use contact-making devices which, in themselves, were a source of trouble and unnecessarily complicated the meter.

We provide an electro-responsive device, such as a watthour meter, a stylus or marking device normally connected by mechanical means solely to the movable member of the watthour meter, a clock mechanism and a record sheet. The clock mechanism is so arranged that the record sheet is advanced periodically while the stylus remains stationary, indicating the maximum energy measured during a predetermined time interval. The clock mechanism is provided with means for disconnecting the stylus from the movable member of the meter after the record sheet has been advanced, to thus permit the stylus to return to its initial position.

The advantage of using one stylus or movable member will be apparent because it indicates, at all times, the amount of energy being measured, it not being necessary to wait until the end of a measuring period, as is the case with devices of this character heretofore constructed.

Figure 6:
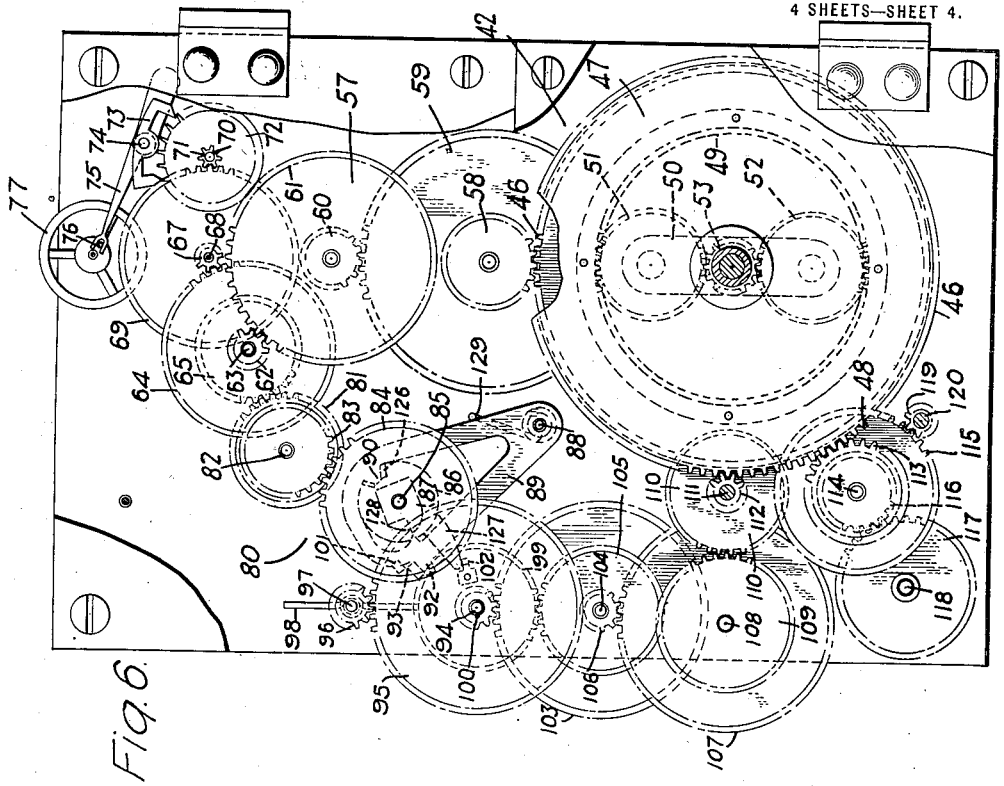
Figure 8:
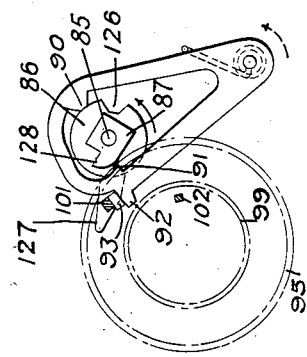
Figure 7:
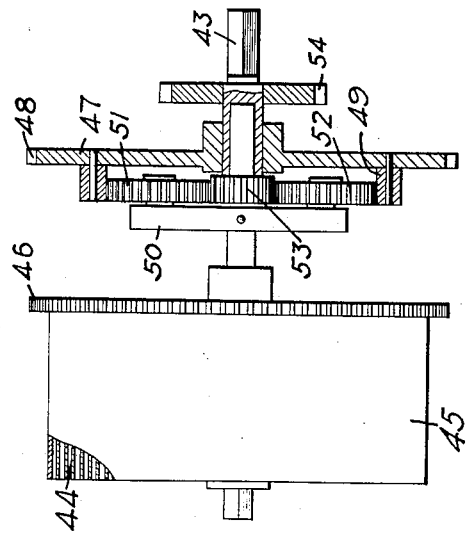

In the accompanying drawings, Figure 1 is a front elevational view of an electrical measuring instrument embodying our invention; Fig. 2 is a side elevational view of the instrument shown in Fig. 1; Figs. 3, 4 and 5 are detailed front and side elevational and top plan views, respectively, of the integrating mechanism, stylus and disconnecting mechanism embodied in the instrument shown in Figs. 1 and 2; Fig. 6 is a detailed side view, partially in elevation and partially in section, of the clock mechanism embodied in our invention; Fig. 7 is an enlarged view, partially in elevation and partially in section, of a portion of the clock mechanism embodied in our invention, and Fig. 8 is an enlarged view of an escapement device embodied in our invention.

In a casing 1 are mounted two electrical instruments 2 and 3 constituting a three-phase watthour meter. The instrument, thus constituted, is of well known construction, being substantially the same as the instrument shown in the United States patent application, Serial No. 631,573, filed June 6, 1911, by William Bradshaw and assigned to the Westinghouse Electric and Manufacturing Company. The instruments 2 and 3, severally comprise a stationary magnetizable core member 4 having a potential and a current winding thereon, damping magnets 5 and a rotatable armature 6. The armatures 6 are mounted on a shaft 7 that has a pinion 8 also mounted thereon. The pinion 8 engages a gear wheel 9 that is mounted on a shaft 10 having a worm 11 also mounted thereon. The worm 11 engages a worm wheel 12 that is mounted on a shaft 13 which is provided with a pinion 14 to engage a gear wheel 15 that is mounted on a shaft 16 for the purpose of driving an integrating mechanism 18 through a pinion 17 that is also mounted on the shaft 16. A rotatable cradle 19 is provided with a shaft 20 upon which is mounted a worm wheel 21 that normally engages the worm 11. A gear wheel 22 is also mounted on the shaft 20 to engage a gear wheel 23 that is mounted on a shaft 24. The shaft 24 has a pinion mounted thereon that engages a gear wheel 26 which is mounted on a shaft 27. The shaft 27 is provided with a pointer or stylus 28 and has one end of a spring 29 attached thereto, the other end of which is secured to a stationary bracket 30. The free end of the pointer or stylus 28 is provided with a pen 31 for the purpose of a record of the indications of the meters 2 and 3 upon sheet 32. A spring 33 is attached, at one end, to the cradle 19 and, its other end, to a stationary member for the purpose of normally retaining the worm wheel 21 in engagement with the worm 11. A rod 34 is provided for periodically rocking the cradle 19 against the action of the spring 33 to disengage the worm wheel 21 from the worm 11 to permit the pointer or stylus 28 to reset to its initial position.

It is to be understood that the watthour meter comprising the instruments 2 and 3 and the shaft 7, so far as its association with the stylus or pointer 28 is concerned, serves as a motor to actuate the stylus or pointer. In other words, the watthour meter comprises an electrically driven member or shaft 7 to which the stylus or pointer 28 is solely mechanically connected, without any intermediate electrical relays or the like. As such, the watthour meter is a "motor meter" that actuates the stylus or pointer 28 to which it is connected by mechanical means only. At the same time, the shaft 7 is an integral part of the electrical measuring instruments 2 and 3 which, in this instance, constitute parts of a three-phase watthour meter, as mentioned above.

The record sheet 32 is disposed on a drum 35 and is adapted to pass in front of a platen or plate 36 and over a driving roller 37 having a plurality of teeth 38 on each edge thereof that engage openings 39 in the edges of the record sheet. The roller 37 is mounted on a shaft 40 upon which is also mounted a gear wheel 41 that is actuated by a clock mechanism 42, as hereinafter more fully set forth.

The clock mechanism 42 is mounted between the usual supporting side plates that are employed in clocks. A shaft 43 is journaled in the plates and has the inner end of a spring 44 attached thereto. The outer end of the spring 44 is connected to a spring case 45 that has teeth 46 formed on its outer surface. The spring case 45 is loosely mounted on the shaft 43, as is also a gear case 47 having external teeth 48 and internal teeth 49. An arm 50 is mounted on the shaft 43 within the gear case 47, and has two pinions 51 and 52 pivotally mounted thereon that engage the internal teeth 49 and also engage a pinion 53 that is also mounted on the shaft 43. A ratchet wheel 54 is also mounted on the shaft 43, and a pawl 55 is adapted to engage the same to preclude uncoiling of the spring 44 from its inner end in the wrong direction. The pawl 55 is restrained in engagement with the ratchet wheel 54 by a flat spring 56.

In order to permit the spring 44 to uncoil continuously from its outer end, a train of gear wheels 57 is provided that comprises a pinion 58, a gear wheel 59, a pinion 60, a gear wheel 61 and a pinion 62. The pinion 62 is loosely mounted on a shaft 63 that has two gear wheels 64 and 65 also mounted thereon. The gear wheel 64 is connected to the pinion 62 through a spring 66 that is disposed around the shaft 63. The spring 66 is provided for the purpose of imposing a substantially constant torque on the escapement device, but, as it forms no part of our invention, except as it coöperates with the clock mechanism to achieve the desired result, it will not be further described. The gear wheel 64 engages a pinion 67 that is mounted on a shaft 68 which also carries a gear wheel 69. The gear wheel 69 engages a pinion 70 that is mounted on a shaft 71 having an escapement wheel 72. A double pallet 73 is mounted on a shaft 74 having a bifurcated lever 75. The bifurcated end of the lever 75 is disposed around a pin 76 in a balance wheel 77. One end of a hair spring 78 is attached to the balance wheel 77 and the other end is connected to one of the supporting plates 79 of the clock casing.

The escapement wheel 72, the pallet 73 and the balance wheel 77 permit the spring 44 to continuously uncoil from its outer end to control an escapement device 80 through the gear wheel 65.

The escapement device 80 is provided for the purpose of releasing the inner end of the spring 44 at predetermined intervals of time to thus advance the record sheet 32 and to disconnect the pointer 28 from the meters 2 and 3 and thus permit the spring 29 to reset the same.

The gear wheel 65 engages a gear wheel 81 that is mounted on a shaft 82 having a second gear wheel 83. The gear wheel 83 engages a gear wheel 84 that is mounted on a shaft 85. On the shaft 85 are also mounted two cam members 86 and 87 that lie in parallel planes and have a lost-motion-pin-and-slot connection with the shaft 85. A shaft 88 has a lever 89 mounted thereon to surround the shaft 85, and also the cam member 87. The lever 89 is provided with an inwardly extending projection 91 lying in the same plane as the lever, an outwardly extending projection 92 also lying in the plane with the lever, a projection 90 extending from the inner side of the lever and lying in a plane at right angles thereto and a projection 93 extending from the projection 92 and lying in a plane at right angles to the lever but on the opposite side thereof with respect to the projection 90. A shaft 94 has a gear wheel 95 mounted thereon that engages a pinion 96 which is mounted on a shaft 97 having a fan 98. The fan 98 is used for the purpose of damping the rotation of the gear wheel 95. A gear wheel 99 and a pinion 100 are also mounted on the shaft 94. The gear wheel 95 is provided with a pin that engages the projection 93 on the lever 89, and the gear wheel 99 is provided with a pin 102 that engages the cam 86, under predetermined conditions. The pinion 100 engages a gear wheel 103 that is mounted on a shaft 104 having a gear 105 and a pinion 106. The gear wheel 105 engages the gear wheel 99 and the pinion 106 engages a gear wheel 107 that is mounted on a shaft 108 having a gear wheel 109. The gear wheel 109 engages a gear wheel 110 that is mounted on a shaft 111 having a pinion 112. The pinion 112 engages the external teeth 48 of the gear case 47.

The teeth 48 also engage a gear wheel 113 that is mounted on a shaft 114 having a gear wheel 115 and a gear wheel 116. The gear wheel 116 engages a gear wheel 117 that is mounted on a shaft 118. The gear wheel 117 engages the gear wheel 41 for the purpose of advancing the record sheet 32 when the escapement device 80 permits the spring 44 to uncoil periodically. The gear wheel 115 engages a pinion 119 that is mounted on a shaft 120 having a star wheel 121.

The teeth of the star wheel 121 are adapted to engage a lever 122 that is connected, through a rod 123, to one arm of a bell-crank lever 124, the other arm of which has a rod 125 connected thereto to engage the rod 34, under predetermined conditions.

The cam 86 is provided with an indentation 126 that is adapted to be engaged by the projection 90 of the lever 89 and is further provided with a projection 127 that lies in a plane parallel to the plane of the cam 86. The projection 127 is adapted to be engaged by the pin 102 carried by the gear wheel 99. The cam 87 is provided with a projection 128 that engages the projection 91 of the lever 89, under predetermined conditions.

The lever 89 is biased toward one position by a spring 129.

The spring 44 is prevented from uncoiling at its inner end because the pin 101 engages the projection 93. However, it is the object of the device 80 to so move the lever 89, at predetermined times, as to permit the gear wheel 95 to make one complete turn under the force of the spring 44 and thus advance the record sheet 32.

The escapement wheel 72 and the pallet 73, through the gear wheel 65, permit the gear wheel 84 and, consequently, the shaft 85 and the cams 86 and 87 to rotate very slowly, depending upon the interval of time desired between successive movements of the record sheet.

Assuming the pin 101 to be in engagement with the projection 93, as shown in Fig. 8 of the drawing, and the shaft 85 to rotate in the direction indicated by the full-line arrow in Fig. 8. As the shaft 85 rotates, the projection 128 on the cam 87 engages the projection 91 on the lever 89, and the projection 90 engages the indentation 126 in the cam 86 to turn the lever a predetermined distance in a direction indicated by the dot-and-dash arrow until the pin 101 becomes disengaged by the projection 93, and the gear wheel 95 makes one complete turn. Since the gear wheel 95 and the gear wheel 99 are mounted on the shaft 94, the pin 102 is also moved until it engages the projection 127 on the cam 86. The cam 86 is moved by the pin 102, relatively to the shaft 85, a sufficient distance to cause the indentation 126 to move out of engagement with the projection 90, and, in so doing, to so move the lever 89 backwardly against the action of the spring 129 that, when the gear wheel 95 completes one rotation, the pin 101 will again engage the projection 93 and restrain the spring 44 from further uncoiling.

When the spring 44 is permitted to uncoil at predetermined intervals of time by the device 80, the pinion 119 is rotated and the star wheel 121 is turned. The star wheel 121 is so constructed that the teeth thereof do not come into engagement with the lever 122 until such time as the movement of the record sheet is nearly completed, thereby permitting the pointer 28 to remain substantially stationary until the advance in the record sheet is completed. When the star wheel 121 is turned, it actuates the rod 34 against the action of the spring 33 to disengage the gear wheel 21 from the worm 11 and thus permit the spring 29 to return the pointer 28 to its initial position.

When current traverses the meters 2 and 3, the pointer of the stylus 28 is advanced over the record sheet to indicate or record the periodic demands for energy until such time as the device 80 releases the gear wheel 95 to permit the gear wheels 51 and 52 to travel around the internal gear formed by the teeth 49 under the force of the spring 44 acting through the pinion 53. The uncoiling of the spring 44 causes the gear case 47 to turn and thus the record sheet to be advanced. While the record sheet is being advanced, the pen 31 remains substantially stationary, and, after the record sheet has advanced, the star wheel 121, through the lever 122, the rod 123, the bell-crank lever 124, the rod 125, and the rod 34 rocks the cradle 19 to permit the pin to return to its initial position, thus recording a figure that may be conveniently and expeditiously read.

While we have illustrated a clock mechanism comprising one spring that uncoils from both ends, it will be understood that our invention may be adapted to a two-spring clock, one spring for advancing the record sheet and for resetting the pen, and the other spring for controlling the device 80. The device is also applicable to other changes, as in the types of motors and escapement devices employed without departing from the spirit and scope of the invention as set forth in the appended claims.

We claim as our invention:

1. In an electrical measuring instrument, the combination with a metering device, of a marking device solely mechanically connected to and actuated directly by the metering device, a record sheet, and means for advancing the record sheet and for resetting the marking device to its initial position a predetermined time interval after the record sheet is advanced.

2. In an electrical measuring instrument, the combination with a motor meter, of a marking device mechanically connected to, and actuated directly by, the motor meter, a record sheet, and means for periodically advancing the record sheet and for disengaging the marking device from the motor meter a predetermined time interval after the record sheet is advanced to permit the marking device to return to its initial position.

3. In a measuring instrument, the combination with a motor meter, of a marking device mechanically connected to said meter, a record sheet, a clock mechanism mechanically connected to the record sheet and adapted to periodically advance the record sheet, and means mechanically connected to the clock mechanism for disconnecting the marking device from the motor meter after each advance of the record sheet.

4. In a measuring instrument, the combination with an electric meter, of a marking device adapted to be operatively connected to the meter, a record sheet, a spring for periodically advancing the record sheet, and means actuated directly by the said spring for disconnecting the marking device from the meter a predetermined time interval after the record sheet is advanced.

5. In a recording meter, the combination with a record sheet and a marking device, of a meter operatively connected to the marking device to directly actuate the same, a spring for advancing the record sheet a predetermined distance at the end of a definite interval of time and for disconnecting the said marking device from the meter after the record sheet is advanced to permit it to return to its initial position.

6. In an electrical measuring instrument, the combination with a marking device, and a record sheet, of a clock mechanism mechanically connected to the record sheet for periodically advancing the record sheet, and means mechanically controlled by said clock mechanism for resetting the marking device after each advance of the record sheet.

7. In an electrical measuring instrument, the combination with a marking device, and a record sheet, of a spring adapted to be periodically released for advancing the record sheet, and a second spring adapted to reset the marking device to its initial position after each advance of the record sheet.

8. In a measuring instrument, the combination with an electric meter, of a marking device mechanically actuated directly by the meter, a record sheet, means for periodically advancing the record sheet, and means actuated by the said advancing means but a time interval out of phase therewith for controlling the disengagement of the marking device from the meter.

9. In a recording measuring instrument, the combination with a motor meter, a record sheet, a marking device normally directly connected to the said meter, of a clock mechanism comprising a spring, an escapement device for continuously uncoiling the said spring, and a retaining device controlled by the continuous uncoiling of the spring for uncoiling the same periodically to advance the record sheet, and means actuated by the periodical uncoiling of the spring for disconnecting the marking device from the meter after the record sheet is advanced.

10. A measuring instrument for recording the maximum value of the energy consumed during predetermined intervals of time comprising a motor meter, a marking device solely mechanically actuated by the motor meter and means for resetting the marking device to its initial position a time interval after each predetermined interval of time during which energy is measured.

11. In a graphic measuring instrument the combination with a motor meter, a record sheet, and a marking device solely mechanically connected to the motor meter for indicating on the record sheet the energy being measured during a predetermined interval of time, of means for periodically advancing the record sheet while the marking device remains substantially stationary, and means controlled by the record-sheet advancing means for resetting the marking device to its initial position to thereby constitute records having substantially flat tops and parallel sides.

12. In a recording measuring instrument, the combination with a marking device and a watthour meter mechanically connected to the marking device to directly actuate the same, of a record sheet, a clock mechanism mechanically connected to the record sheet for periodically advancing the same and for disconnecting the marking device from the watthour meter after each advance of the record sheet.

13. The combination with a marking device, a measuring instrument operatively connected to the marking device to directly actuate the same, and a record sheet, of a clock mechanism mechanically connected to the record sheet for periodically advancing the record sheet and for disconnecting the marking device from the instrument after each advance of the record sheet.

14. In a recording measuring instrument, the combination with an electrical meter, a marking device actuated thereby and a record sheet, of a clock mechanism operatively connected to the record sheet for directly advancing the same and for mechanically controlling the resetting of the marking device to its initial position after each advance of the record sheet.

15. A measuring instrument for recording the maximum value of the energy consumed during predetermined intervals of time comprising a motor meter, a marking device solely mechanically actuated by the motor meter and means for resetting the marking device to its initial position after each predetermined interval of time during which energy is measured.

16. In a measuring instrument, the combination with a motor meter, of a marking device solely mechanically connected to and actuated directly by the motor meter, a record sheet, and means for advancing the record sheet and for resetting the marking device to its initial position after each advance of the record sheet.

17. In a recording meter, the combination with a record sheet and a marking device, of a meter mechanically connected to the marking device for directly actuating the same, means for advancing the record sheet a predetermined distance at the end of a definite interval of time and for disconnecting the marking device from the meter after the record sheet is advanced to permit it to return to its initial position.

18. An electrical instrument for measuring the maximum value of the energy consumed during predetermined intervals of time comprising a motor meter, a pointer solely mechanically actuated by said motor meter, and means for resetting said pointer to its initial position after each predetermined interval of time during which energy is measured.

In testimony whereof, we have hereunto subscribed our names this 29th day of June, 1915.

WILLIAM M. BRADSHAW.
WALTER G. MYLIUS.